United States Patent
Ghelfi et al.

(10) Patent No.: US 8,112,005 B2
(45) Date of Patent: Feb. 7, 2012

(54) OPTICAL RECEIVER SCHEME WITH ALL-OPTICAL DECISION ELEMENT

(75) Inventors: Paolo Ghelfi, Goito (IT); Mirco Scaffardi, Parma (IT); Antonella Bogoni, Montova (IT); Luca Poti, Pisa (IT)

(73) Assignee: Ericsson AB, Stockholm (SE)

( * ) Notice: Subject to any disclaimer, the term of this patent is extended or adjusted under 35 U.S.C. 154(b) by 850 days.

(21) Appl. No.: 12/088,449

(22) PCT Filed: Sep. 28, 2006

(86) PCT No.: PCT/EP2006/009428
§ 371 (c)(1),
(2), (4) Date: Apr. 11, 2008

(87) PCT Pub. No.: WO2007/039225
PCT Pub. Date: Apr. 12, 2007

(65) Prior Publication Data
US 2008/0232824 A1    Sep. 25, 2008

(30) Foreign Application Priority Data
Sep. 28, 2005   (IT) ............... MI2005A1802

(51) Int. Cl.
*H04J 14/08* (2006.01)
*G02F 1/35* (2006.01)
*G02B 6/42* (2006.01)

(52) U.S. Cl. ............ 398/211; 398/93; 398/94; 398/207; 398/176

(58) Field of Classification Search .................. 398/176
See application file for complete search history.

(56) References Cited

U.S. PATENT DOCUMENTS

| | | | | |
|---|---|---|---|---|
| 5,050,183 A * | 9/1991 | Duling, III | ............... | 372/94 |
| 5,655,039 A * | 8/1997 | Evans | ............... | 385/27 |
| 5,999,292 A * | 12/1999 | Dennis et al. | ............... | 398/101 |
| 6,424,773 B1 * | 7/2002 | Watanabe | ............... | 385/122 |
| 6,477,300 B2 * | 11/2002 | Watanabe et al. | ............... | 385/122 |
| 7,596,325 B2 * | 9/2009 | Park et al. | ............... | 398/185 |
| 2001/0015842 A1 * | 8/2001 | Patel et al. | ............... | 359/138 |

(Continued)

FOREIGN PATENT DOCUMENTS

EP   1130456   9/2001

(Continued)

OTHER PUBLICATIONS

Lee, Hyuek Jae; Kim, Kwangjoon; Kim, Hae Geun; "Pulse-amplitude equalization of rational harmonic mode-locked fiber laser using a semiconductor optical amplifier loop mirror", Feb. 1999, Opticas Communications.*

(Continued)

*Primary Examiner* — Danny Leung
(74) *Attorney, Agent, or Firm* — Coats & Bennett, P.L.L.C.

(57) ABSTRACT

A receiver scheme for optical signals in Return-to-zero (RZ) systems comprises a conventional receiver at the input of which is placed an all-optical decision element realized with nonlinear optical elements. This allows obtaining a substantial increase in performance compared with a simple conventional receiver optimized for NRZ signals. In particular, an optical decision is made up advantageously of two non-linear optical loop mirrors (NOLMs) arranged in cascade with an optical amplifier at the input and a pass-band filter at the output. The loops lengths may be different, as may be the splitting ratios of the couplers of the NOLMs.

21 Claims, 2 Drawing Sheets

U.S. PATENT DOCUMENTS

2002/0176152 A1* 11/2002 Parolari et al. .............. 359/326
2005/0180758 A1 8/2005 Seguineau et al.

FOREIGN PATENT DOCUMENTS

WO    WO 2005027379 A2 *  3/2005

OTHER PUBLICATIONS

Ghelfi, P. et al. "Additional All-Optical Decision Element Improving the Performance of Band-Limited Receivers in RZ Systems." 31st European Conference on Optical Communication, 2005 (ECOC 2005). Sep. 25-29, 2005, vol. 3, pp. 323-324.

Watanabe, S. et al. "All-optical Noise Suppression using Two-Stage Highly-Nonlinear Fibre Loop Interferometers." Electronics Letters, Jan. 6, 2000, vol. 36, No. 1, pp. 52-53.

Bogoni, A. et al. "NOLM-Based 3-Stage Regenerator for 160 GBIT/S Transmission Systems." ECOC, Italy, Rimini, 2003, Digital Photonics Subsystems, Ultra-Fast Optical Subsystems.

Meissner, M. et al. "Noise Reduction Performance of a NOLM Based 2-R-regenerator in Dependence on the OSNR." IEEE Photonics Technology Letters. vol. 16, Issue 9, Sep. 2004, pp. 2105-2107.

Murakami, M. et al. "Quarter Terabit (25×10 Gb/s) Over 9288 km WDM Transmission Experiment using Nonlinear Supported RZ Pulse in Higher Order Fiber Dispersion Managed Line." ECOC '98, Sep. 20-24, 1998, Madrid, Spain.

Rohde, H. et al. "Towards a Meshed Ultra High Speed TDM Optical Network: Concept, OADM Architecture and Proof of Principle." 2004 Optical Fiber Communication Conference (OFC 2004), Feb. 23-27, 2004.

Winzer, P. et al. "Optimum Filter Bandwidths for Optically Preamplified NRZ Receivers." Journal of Lightwave Technology, vol. 19, No. 9, Sep. 2001, pp. 1263-1273.

* cited by examiner

OPTICAL RECEIVER SCHEME WITH ALL-OPTICAL DECISION ELEMENT

This invention relates to the use of an all-optical decision element in an optical receiver scheme for the purpose of improving the performance of conventional limited-bandwidth receivers in RZ systems.

To develop the new generation of optical networks there is ever more interest in Return-to-Zero (RZ) data formats, which could be used both in Optical Time Division Multiplexing (OTDM) systems and Wavelength Division Multiplexed (WDM) systems.

Known optimal conventional receivers realize an electrical decision on the received signal by using relatively costly electronic or optoelectronic devices placed within them.

RZ optical signals have a bandwidth B that exceeds the bit rate R of a single channel; the optimal RZ receiver bandwidth is proportional to the bandwidth B rather than to the bit rate R as it is instead for the Non-Return-to-Zero (NRZ) data formats. Since future increases in the capacity of the RZ systems will require pulse signals with increased bandwidths, conventional RZ receivers will consequently need ever more costly electronic and very fast optoelectronic components to satisfy the characteristics of the input signals even in the case of relatively low bit rates as for demultiplexed OTDM channels.

The general purpose of this invention is to remedy the above-mentioned shortcomings by using additional all-optical decision elements placed at the input of receivers in RZ systems so as to realize a first decision in the optical domain.

In view of this purpose it was sought to provide in accordance with this invention a receiver scheme for optical signals in RZ systems characterized in that it comprises a conventional receiver at the input of which is place an all-optical decision element realized with nonlinear optical elements.

By a "conventional" receiver we may mean a receiver that is arranged to convert an incoming optical signal into an electronic signal.

It was also sought to realize in accordance with this invention an all-optical decision element designed to be placed at the input of RZ receivers to increase their performance and comprising two NOLMs arranged in cascade.

To clarify the explanation of the innovative principles of this invention and its advantages compared with the prior art there is described below with the aid of the annexed drawings a possible embodiment thereof by way of non-limiting example applying said principles. In the drawings:

FIG. 1 shows the scheme of a receiver fitted with an optical decision maker in accordance with this invention, and FIGS. 2 to 4 show graphs with examples of improvements in performance obtained by using this invention.

With reference to the figures, FIG. 1 shows a receiver scheme designated as a whole by reference number 10 and using the principles of this invention. In accordance with this invention, at the input of a conventional receiver designated as a whole by reference number 11 there is placed an additional all-optical decision element 12 through which passes the optical signal which arrives at the input 13 and is directed to the conventional receiver. The use of an additional all-optical ultra fast decision element just before the conventional limited-bandwidth receiver allows making a first decision in the optical domain without any bandwidth limitation and improving the quality of the signal received. The additional decision element and conventional receiver realize thus an improved optical receiver.

The conventional receiver structure 11 used is not further described because easily imaginable to those skilled in the art in a plurality of possible forms; typically it converts incident optical signals into output electronic signals.

The all-optical decision element (ODE) is made up of elements which, by using nonlinear optical phenomena, make a decision about the optical signal applied to it.

The very large bandwidth of the nonlinear all-optical phenomena together with the ability of developing low-cost, integrable and bit rate transparent optical schemes makes this solution competitive with the conventional optimal receiver with decision completely realized within it by means of electronic or optoelectronic circuits.

It was found particularly advantageous to realize the all-optical decision element by means of known optical elements called Nonlinear Optical Loop Mirrors (NOLM).

Indeed, a decision element can be obtained in the optical domain by utilizing the NOLM nonlinear structure characteristics, which allow faster operation compared with other schemes based, for example, on semiconductor devices. In addition, the ability to use short sections of new highly-nonlinear fibres allows increasing the stability and efficiency of the interferometer scheme.

As known, NOLMs comprise basically an optical fibre loop connected to the output gates of a fibre coupler. An input pulse is thus divided in two pulses with different magnitudes proportionate to the coupling relationship. Operation of the NOLM is generally based on Self Phase Modulation (SPM) in the loop fibre. The pulses counterpropagate over the loop and are recombined when they reach the coupler. The recombination effect depends on the characteristics (for example, the phase) which the two counterpropagating signals have taken on during their respective travels in the loop. A known polarization controller (PC) along the fibre loop ensures that the two parts of the signal are recombined at the output of the NOLM with the desired polarization (in particular, parallel). An attenuator element also placed along the loop can be used to unbalance the counterpropagating signal components.

In this manner, with appropriate setting up of the components, in a 50:50 NOLM when the input optical power is low, i.e. near the zero level, the two counterpropagating components of the signal interact in phase opposition, then the ring acts as a mirror and the signal is completely reflected backward. Oppositely, when the input power is high enough, i.e. near the peak, the fibre induces a different phase shift on the two unbalanced parts of the signal, so that the two counter-propagating components of the signal do not interfere in phase opposition. All this realizes good operation as 'pedestal' suppressor and cancellation of the noise in the spaces between the pulses is obtained.

As a result, a NOLM with a 50:50 coupler can reduce the pulse width and clean out the noise in the spaces between the high bits.

FIG. 1 shows an ODE 12 made up of an input optical amplifier 14 (advantageously a known Erbium Doped Fibre Amplifier (EDFA) followed by two NOLMs 15, 16 in cascade.

As will be seen below, the use of the second NOLM in series with the first leads to a considerable improvement in the stepped characteristic of the decider with a consequent improvement in the accuracy of decisions.

While the first NOLM 15 has an attenuator in the ring, the second NOLM has no need of an attenuator in the ring but only of the polarizer. Advantageously, the fibre ring of the second NOLM is approximately twice as long as that of the first.

Again advantageously, the first NOLM 15 is realized with a 3 dB coupling (50:50) and 250 m of Highly Non-Linear Fibre (HNLF). The second NOLM is made with a 10:90 coupler and 500 m of HNLF. Between the two NOLMs there is advantageously an adjustable optical attenuator 17.

At the output of the second NOLM, an optical filter 18 eliminates the noise of the extra band Amplified Spontaneous Emissions (ASE). It is to be noted that this configuration allows using a single EDFA at the input of the first NOLM since the power required by the second fibre ring is available at the output of the first NOLM without need of further amplification.

Figure 1:
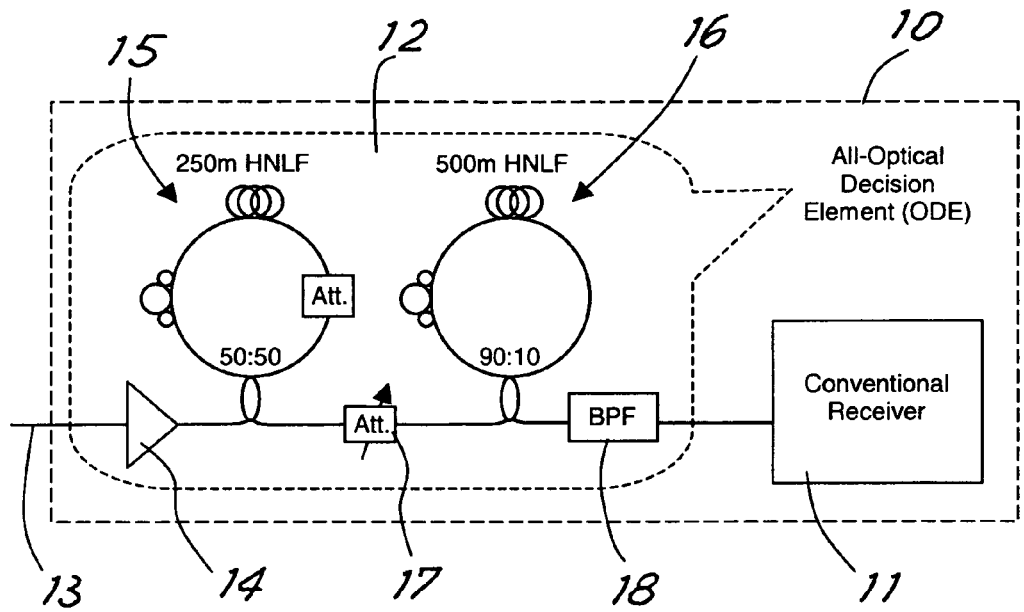
Figure 2:
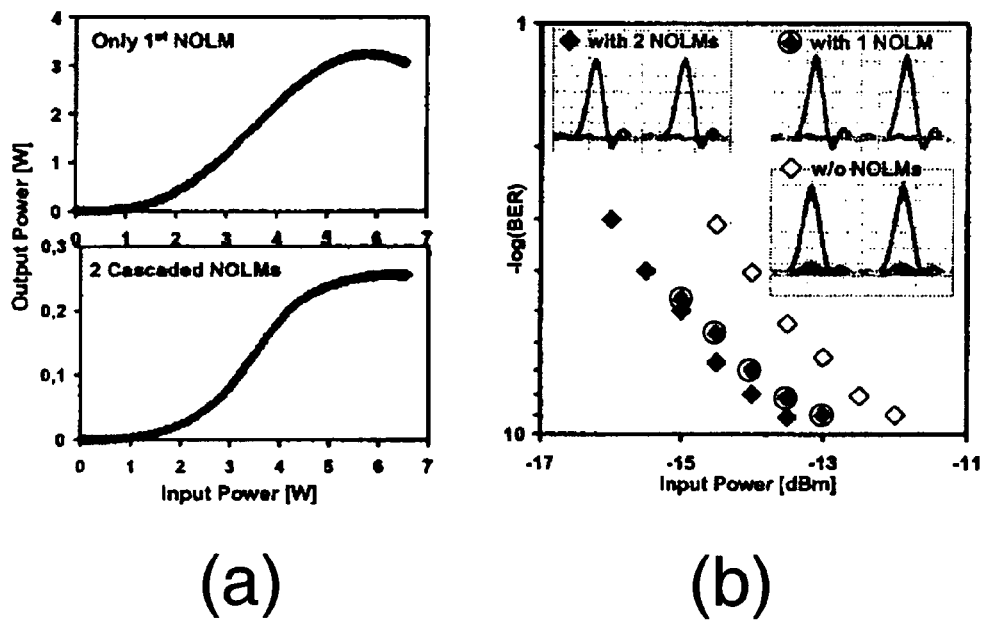
FIG. 2a shows the nonlinear characteristics of the first NOLM alone (above) and of the two cascaded rings (below). The total contribution of the second NOLM to the total characteristics is clear, making them very similar to an ideal step function.
FIG. 2b shows the curves of the bit error rate (BER) measured at the input of the ODE, at the output of the first NOLM and at the output of the second NOLM.

It can be noted that in the case considered, use of the additional ODE improves the performance of the conventional receiver by 1 dB and by 1.5 dB at the BER=$10^{-9}$, using respectively a single NOLM and two cascaded NOLMs. The improvement in the quality of the signal passing over the two stages of the ODE is also clear from the rough diagrams in the boxes of FIG. 2b.

The benefits from the use of an additional ODE directly at the input of a conventional receiver with limited bandwidth proved surprising.

Shown below is the performance improvement produced by the use of a receiver in accordance with this invention and comprising an additional all-optical decision element in an RZ system where the bandwidth of the signal exceeds the bandwidth of the conventional receiver.

For this experimental purpose, there was realized a 10 Gbps RZ system including a 10 GHz NRZ receiver. The RZ signal is generated by a mode-locked fibre laser at 1551 nm and producing 4 ps optical signals at 10 GHz. The pulses are then modulated with a $2^{31}$-1 pseudo-random bit sequence. This signal is coupled with the noise emitted from an ASE source. By adjusting the noise level, different OSNRs are realized.

An optical filter must be used for reshaping the optical signal and suppressing the extra band noise. Two different filters were used with bandwidth of 0.3 nm and 1.2 nm to generate final pulse widths of approximately 15 ps and 5 ps respectively. At the input of the receiver a variable optical attenuator allows changing the input power while holding the OSNR unchanged.

Figure 3:
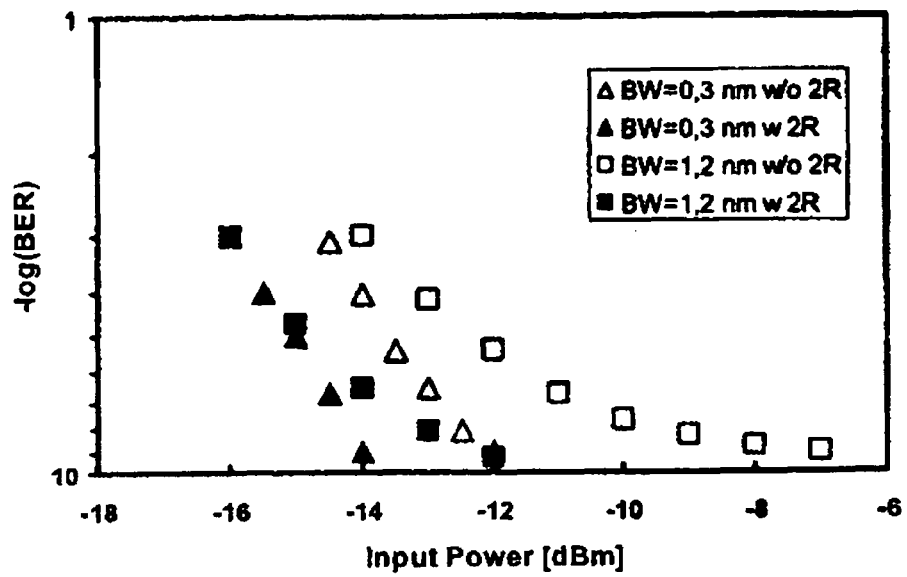

In such a configuration the increase in performance was measured first of all by changing the bandwidth of the signal in order to study the impact of different levels of disagreement between the bandwidths of the conventional receiver and the RZ signal. FIG. 3 shows the curves of the BER measured with and without additional ODE, for bandwidth of the 0.3 nm and 1.2 nm pulses, and a fixed OSNR equal to 15 dB (with 0.1 nm of resolution in the bandwidth). It is clear that use of the ODE considerably improves receiver performance.

Interpolations of the linear region of the BER curves allow detecting a negative power penalty at BER=$10^{-9}$ from 1.5 dB to 2 dB for bandwidth of the 0.3 nm and 1.2 nm signals. This result confirms that the improvement in performance due to the use of the additional ODE increases with the disagreement between the bandwidths of the conventional receiver and the signal. In addition, in the case of 1.2 nm signal bandwidth, the conventional receiver alone reaches a plateau in the BER curve while in using the receiver scheme in accordance with this invention this is not clear considering BER up to $10^{-10}$.

Figure 4:
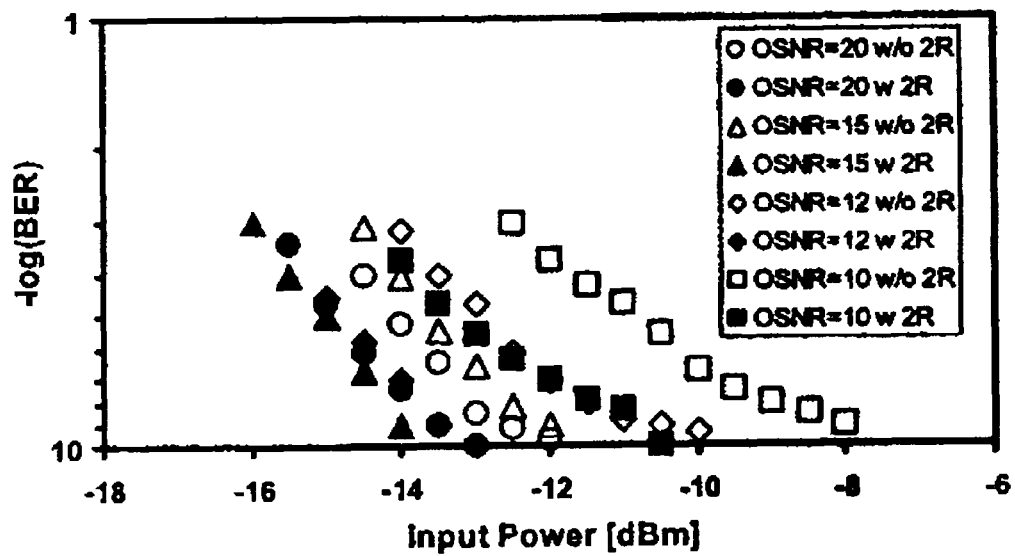

The behaviour of the receiver proposed was also investigated for the different OSNRs of the input signal. Experimental results are shown in FIG. 4 while the BER curves with and without additional ODE are shown for OSNR=10, 12, 15 and 20 dB using a signal bandwidth of 0.3 nm. In each case considered, the receiver in accordance with this invention with ODE has better performance compared with only the conventional receiver, with negative power penalty at BER=$10^{-9}$ from 1.5 dB (OSNR 20 dB) to 2 dB (OSNR 10 dB) which increase as the OSNR decreases.

It is important to note that in the cases of OSNR=12, 15 and 20 dB the BER curves obtained using the additional ODE are compressed into 0.5 dB. This is due to the characteristics of the scheme (FIG. 2a) which can correctly decide the signal if the input noise is confined in its 'flat' regions. As the noise goes beyond these regions, the ODE cannot decide correctly and the BER increases as in the case of OSNR=10 dB. This behaviour continues to be satisfactory for the undeniable advantages that the receiver in accordance with this invention possesses compared with a simple conventional receiver.

It is now clear that the preset purposes have been achieved by providing a receiver scheme with an all-optical decision element at the input that improves substantially the performance of conventional limited-bandwidth receivers in RZ systems.

The improvement in performance increases with the bandwidth of the signal and decreases with the OSNR; the output signal quality is kept constant for input OSNRs higher by approximately 12 dB. Therefore, the input ODE allows extending the use of conventional receivers to signals with broader bandwidth. The ability to develop ODES based on low-cost optical schemes integrable and transparent to the bit rate makes this solution competitive with the use of optimal conventional receivers.

Naturally the above description of an embodiment applying the innovative principles of this invention is given by way of non-limiting example of said principles within the scope of the exclusive right claimed here. For example, The ODE and the conventional receiver can be realized in different forms even though the ODE structure described above in greater detail was found particularly advantageous.

The invention claimed is:

1. An optical receiver apparatus for use in a Return-to-Zero (RZ) system, the optical receiver apparatus comprising a conventional receiver and an all-optical decision element (ODE) at the input of the conventional receiver, the ODE realized with nonlinear optical elements comprising first and second non-linear optical loop mirrors (NOLMs) arranged in cascade, wherein the first NOLM has a first coupler arranged to split an optical RZ input signal incident thereon substantially equally into first counter-propagating loop signals that recombine at the first coupler to form a reduced pulse-width optical RZ signal for coupling to an input of the second NOLM and the second NOLM has a second coupler arranged to split an optical RZ signal incident thereon into substantially unequal second counter-propagating loop signals that recombine at the second coupler to form an output optical signal for coupling to the conventional receiver.

2. The optical receiver apparatus of claim 1, wherein the ODE further comprises an adjustable optical attenuator between the first and second NOLMs.

3. The optical receiver apparatus of claim 1, wherein the ODE further comprises a pass-band optical filter at the output of the second NOLM, the pass-band optical filter having a bandwidth for eliminating amplified spontaneous emissions (ASE) noise outside the bandwidth of the signals to be received.

4. The optical receiver apparatus of claim 1, wherein the ODE further comprises an optical amplifier preceding the input of the first NOLM.

5. The optical receiver apparatus of claim 4, wherein the optical amplifier is an erbium-doped fiber amplifier (EDFA).

6. The optical receiver apparatus of claim 1, wherein the first coupler splits its signal with a power ratio between 45:55 and 55:45, inclusive, and the second coupler splits its signal such that the strongest portion of the split signal from the second coupler has at least three times the power of the weaker portion.

7. The optical receiver apparatus of claim 1, wherein the first coupler is a 50:50 coupler and the second coupler is a 90:10 coupler.

8. The optical receiver apparatus of claim 1, wherein the first NOLM, or the second NOLM, or both, comprises a Highly Non-Linear Fiber (HNLF)-type fiber loop.

9. The optical receiver apparatus of claim 1, wherein the second NOLM has a loop length longer than that of the first NOLM.

10. The optical receiver apparatus of claim 9, wherein the loop length of the second NOLM is at least double the loop length of the first NOLM.

11. The optical receiver apparatus of claim 9, wherein the loop length of the second NOLM is approximately double the loop length of the first NOLM.

12. The optical receiver apparatus of claim 1, wherein the first NOLM has a length of about 250 meters and the second NOLM has a length of about 500 meters.

13. An all-optical decision element (ODE) designed to be placed at the input of a Return-to-Zero (RZ) receiver, the ODE comprising first and second non-linear optical loop mirrors (NOLMs) arranged in cascade, wherein the first NOLM has a first coupler arranged to split an optical RZ input signal incident thereon substantially equally into first counter-propagating loop signals that recombine at the first coupler to form a reduced pulse-width optical RZ signal for coupling to an input of the second NOLM and the second NOLM has a second coupler arranged to split an optical RZ signal incident thereon into substantially unequal second counter-propagating loop signals that recombine at the second coupler to form an output optical signal for coupling to the RZ receiver.

14. The ODE of claim 13, further comprising an adjustable optical attenuator between the first and second NOLMs.

15. The ODE of claim 13, further comprising a bandpass optical filter at the output of the second NOLM, the bandpass optical filter having a passband to eliminate the amplified spontaneous emissions (ASE) noise outside the bandwidth of the signals to be received.

16. The ODE of claim 13, further comprising an optical amplifier at the input of the first NOLM.

17. The ODE of claim 16, wherein the optical amplifier is an erbium-doped fiber amplifier (EDFA).

18. The ODE of claim 13, wherein the first coupler is a 50:50 coupler and the second coupler is a 90:10 coupler.

19. The ODE of claim 13, wherein the first NOLM or the second NOLM, or both, comprises a Highly Non-Linear Fiber (HNLF)-type fiber loop.

20. The ODE of claim 13, wherein the second NOLM has a loop length approximately double the loop length of the first NOLM.

21. The ODE of claim 13, wherein the first NOLM has a length of about 250 meters and the second NOLM has a length of about 500 meters.

\* \* \* \* \*

UNITED STATES PATENT AND TRADEMARK OFFICE
CERTIFICATE OF CORRECTION

| | | |
|---|---|---|
| PATENT NO. | : 8,112,005 B2 | Page 1 of 1 |
| APPLICATION NO. | : 12/088449 | |
| DATED | : February 7, 2012 | |
| INVENTOR(S) | : Ghelfi et al. | |

It is certified that error appears in the above-identified patent and that said Letters Patent is hereby corrected as shown below:

On the Title page, Item (56), under "OTHER PUBLICATIONS", Line 3,
delete "Opticas" and insert -- Optics --, therefor.

Signed and Sealed this
Nineteenth Day of June, 2012

David J. Kappos
*Director of the United States Patent and Trademark Office*